United States Patent [19]

Belkhiter

[11] Patent Number: 4,928,221
[45] Date of Patent: May 22, 1990

[54] PART PROGRAM GENERATING SYSTEM
[75] Inventor: Bruno M. Belkhiter, Lewisville, N.C.
[73] Assignee: Westinghouse Electric Corp., Pittsburgh, Pa.
[21] Appl. No.: 179,685
[22] Filed: Apr. 11, 1988
[51] Int. Cl.$^5$ ............................................. G06F 15/00
[52] U.S. Cl. ............................... 364/191; 364/474.24
[58] Field of Search ........... 364/191, 192, 193, 474.24, 364/300, 200

[56] References Cited

U.S. PATENT DOCUMENTS

| | | | |
|---|---|---|---|
| 3,534,396 | 10/1970 | Hart et al. | 364/474.24 |
| 3,548,173 | 12/1970 | Pascoe et al. | 364/474.24 |
| 4,393,450 | 7/1983 | Jerard | 364/474.05 |
| 4,697,240 | 9/1987 | Ceder et al. | 364/191 |

Primary Examiner—Allen MacDonald
Attorney, Agent, or Firm—B. R. Nath

[57] ABSTRACT

The present invention is a system that takes a drawing definition produced by a CAD/CAM system 10 and produces a debugged part program. The drawing definition is used to produce a sequence of processes which will produce the part. The drawing definition is a list of the surfaces which create the part. The list is scanned by a process planner 14 and a list of primitive shapes and transition points in each shape is created. The transition points are used to create a process tree defining regions for machining. The tree is populated with region boundaries that are used to designate machining operations. The boundaries are then used to select particular processes based on the shape to be machined during the operation by traversing a shape tree looking for a match. The process selection also specifies tools, feeds and speeds necessary for rough machining the part. During process selection the size of the region is also determined and from the tool selection, the number of rough cutting passes are determined for each process. The sequence of the processes is determined by scanning the process tree and concatenating like processes and, within the like processes, the processes with the same tools and preferred tool direction. A finishing process is produced by creating and scanning a continuous part surface to produce contouring cuts. An appropriate machine is selected based first on the rough stock dimensions of the stock to be used to make the part and then on the number of tools that can be held by the machine and possible feed speeds of the machine. The sequence of processes and process parameters are used by a code generator 16 to complete macrocalls corresponding to the processes. The resulting part program is transferred to a code processor 18 which produces the machine tool code for the particular machine 20 selected.

12 Claims, 10 Drawing Sheets

| NOTCH | SHAPE | |
|---|---|---|
| NOTCH |  | ~200 |
| LEFT – SLANT – NOTCH |  | ~202 |
| RIGHT – SLANT – NOTCH |  | ~204 |
| LEFT – ROUNDED – SLANT – NOTCH |  | ~206 |
| RIGHT – ROUNDED – SLANT – NOTCH |  | ~208 |
| SLANT – NOTCH |  | ~210 |

FIG. 8A

| GROOVE | SHAPE | |
|---|---|---|
| SLANT – GROOVE |  | ~212 |
| SHORT – GROOVE |  | ~214 |
| RIGHT – SLANT – GROOVE |  | ~216 |
| LEFT – SLANT – GROOVE |  | ~218 |
| RIGHT – ROUNDED – SLANT – GROOVE |  | ~220 |
| LEFT – ROUNDED – SLANT – GROOVE |  | ~222 |
| SHORT – RIGHT – SLANT – GROOVE |  | ~224 |
| SHORT – LEFT – SLANT – GROOVE |  | ~226 |
| SHORT – RIGHT – ROUNDED – SLANT – GROOVE |  | ~228 |
| SHORT – LEFT – ROUNDED – SLANT – GROOVE |  | ~230 |

FIG. 8B

| BLOCK | SHAPE | |
|---|---|---|
| LEFT − BLOCK |  | ~232 |
| RIGHT − BLOCK |  | ~234 |
| LEFT − SLANT − BLOCK |  | ~236 |
| RIGHT − SLANT − BLOCK |  | ~238 |
| LEFT − ROUNDED − BLOCK |  | ~240 |
| RIGHT − ROUNDED − BLOCK |  | ~242 |
| LOW − LEFT − ROUNDED − BLOCK |  | ~244 |
| LOW − RIGHT − ROUNDED − BLOCK | 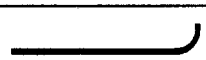 | ~246 |

FIG. 8C

| BLOCK | SHAPE | |
|---|---|---|
| HIGH − RIGHT − ROUNDED − BLOCK |  | ~248 |
| HIGH − LEFT − ROUNDED − BLOCK |  | ~250 |
| LEFT − ROUNDED − SLANT − BLOCK |  | ~252 |
| RIGHT − ROUNDED − SLANT − BLOCK |  | ~254 |
| LEFT − DOUBLE − SLANT − BLOCK |  | ~256 |
| RIGHT − DOUBLE − SLANT − BLOCK |  | ~258 |
| V − DOUBLE − SLANT − BLOCK |  | ~260 |
| REVERSE − RIGHT − SLANT − BLOCK | 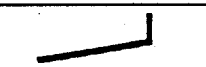 | ~262 |
| REVERSE − LEFT − SLANT − BLOCK | 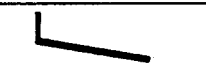 | ~264 |

FIG. 8D

| BLOCK | SHAPE | |
|---|---|---|
| LOW – LEFT – ROUNDED – SLANT – BLOCK |  | ~268 |
| LOW – RIGHT – ROUNDED – SLANT – BLOCK |  | ~270 |
| LEFT – ROUNDED – DOUBLE – SLANT – BLOCK |  | ~272 |
| RIGHT – ROUNDED – DOUBLE – SLANT – BLOCK |  | ~274 |
| REVERSE – LEFT – ROUNDED – SLANT – BLOCK |  | ~276 |
| REVERSE – RIGHT – ROUNDED – SLANT – BLOCK |  | ~278 |

| CORNER | SHAPE | |
|---|---|---|
| RIGHT – CORNER |  | ~280 |
| LEFT – CORNER |  | ~282 |
| RIGHT – SLANT – CORNER |  | ~284 |
| LEFT – SLANT – CORNER |  | ~286 |
| RIGHT – ROUNDED – CORNER |  | ~288 |
| LEFT – ROUNDED – CORNER |  | ~290 |

| CORNER | SHAPE | |
|---|---|---|
| SLANT – LEFT – CORNER |  | ~292 |
| SLANT – ROUNDED – RIGHT – CORNER |  | ~294 |
| SLANT – ROUNDED – LEFT – CORNER | 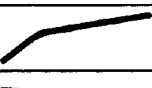 | ~296 |
| RIGHT – DOUBLE – SLANT – CORNER | 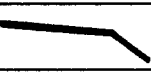 | ~298 |
| LEFT – DOUBLE – SLANT – CORNER | 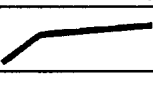 | ~300 |
| RIGHT – ROUNDED – DOUBLE – SLANT – CORNER |  | ~302 |
| LEFT – ROUNDED – DOUBLE – SLANT – CORNER |  | ~304 |

FIG. 8G

| CORNER | SHAPE | |
|---|---|---|
| RIGHT – ROUNDED – SLANT – CORNER |  | ~306 |
| LEFT – ROUNDED – SLANT – CORNER |  | ~308 |
| RIGHT – ROUNDED – CORNER |  | ~310 |
| LEFT – ROUNDED – CORNER | 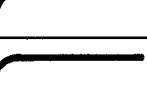 | ~312 |
| LOW – LEFT – ROUNDED – CORNER | 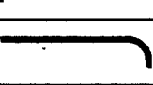 | ~314 |
| LOW – RIGHT – ROUNDED – CORNER | 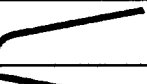 | ~316 |
| LOW – LEFT – ROUNDED – SLANT – CORNER |  | ~318 |
| LOW – RIGHT – ROUNDED – SLANT – CORNER | 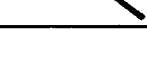 | ~320 |
| SLANT – RIGHT – CORNER |  | ~322 |

FIG. 8H

PART PROGRAM GENERATING SYSTEM

BACKGROUND OF THE INVENTION

1. Field of the Invention

The present invention is directed to a system which generates a part program for a numerical control machine tool from a part definition drawing and more particularly to a system which plans the order of machining operations and produces the numerical control program code for the sequence of manufacturing operations which includes selecting the proper tools, feed speeds and machine tool.

2. Description of the Related Art

Conventionally when a new part such as a socket head for a nuclear reactor pressure vessel cap needs to be machined. A part designer will sit down at a CAD/CAM design work station and produce a drawing for the desired part. The drawing includes notations as to type of rough stock material and dimensions of the part. The drawing is given to a numerical control part programmer, a person who specializes in creating a numerical control part program from the drawing. The part programmer uses machine specifications to pick the particular machine to be used based on rough stock size, the physical characteristics of the machine, possible machining speeds as compared to the appropriate speeds for the material using the tools necessary for the different machining operations, the number of tools the machine will hold and whether the part must be manually turned around. The part program is then provided to a computer program called a code processor that generates the actual numerical control machine code for controlling the target machine. The program is then test executed by a machine tool and if bugs are discovered the part programmer revises the program.

In situations where a new part is encountered, the part programmer may spend several days to several weeks producing, debugging and testing the part program until a satisfactory program is produced. This process can sometimes be shortened if the part programmer has an extensive library of macro-programs that can be modified for different purposes. A macro-program is a program that is designed for a specific type machining operation and in which the various machining parameters, such as feeds and speeds, number of passes, length of each pass, etc. are left as variables to be set by a macrocall statement. A macro-program is very similar in function to a subroutine in other types of computer languages. Even when an extensive part program library including part macro-programs is available, the time between the initial part request and the finished product is very long. As can be seen from the above discussion, there is a need in the machine tool industry for a system which will generate part programs directly from drawings to speed up the process of producing the desired part and reduce the lead time necessary for manufacturing the part.

SUMMARY OF THE INVENTION

It is an object of the present invention to produce a part program suitable for machining a part from a drawing definition without the need for human part programmer intervention.

It is another object of the present invention to reduce the lead time between the request for a particular part and the machining of that part.

It is also an object of the present invention to reduce manpower costs.

The above objects can be accomplished by a system that takes a drawing definition produced by a CAD/CAM system and produces a ready to execute part program. The system uses the drawing definition to produce a sequence of operations which will produce the part. The operations are then used to select particular processes (macro-programs) based on the shape to be machined during each operation step. The process selection also specifies the rough machining speeds and tools necessary for rough machining the part. After all processes are specified a finishing or contouring process is produced. An appropriate machine is selected based on part material, number of tools and rough stock size. The resulting part program is transferred to a code processor which produces the machine control code for the particular machining tool selected.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 8A–8H illustrate the shapes recognized by the tree of FIG. 7 or Table 2;

DESCRIPTION OF THE PREFERRED EMBODIMENTS

The description of the present invention forth below will be oriented to machining processes which involve turning a part on a lathe, however, one of ordinary skill in the art can adapt the present invention to other types of machine tools. A bottom rough stock boundary in a turning operation is the axis of rotation or symmetry for the part and a top rough stock boundary is set at the radius of the rough stock.

Figure 1:
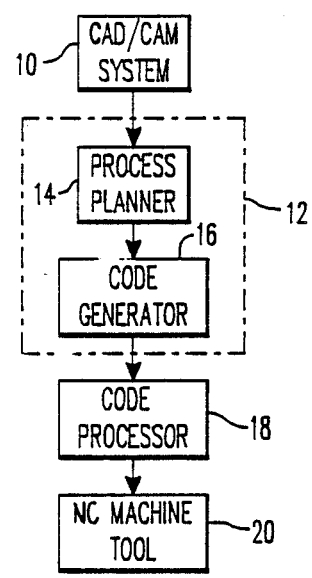
FIG. 1 is a block diagram of the present invention.

As depicted in FIG. 1, a conventional CAD/CAM system 10 is used by the part designer to produce a drawing. The CAD/CAM system provides a shape signature to the present invention which includes a definition for each surface on the part. The shape signature also includes the type of material from which the part is to be made and the rough stock size (left, right, top and bottom boundaries from a reference) and finish surface tolerance. An appropriate CAD/CAM system is a Sun Microsystems work station available from Cimlinc, Inc. of Elk Grove Village, Ill. This system preferably uses the CIMLINC/CIMCAD module also available from Cimlinc, Inc. which will produce an appropriate shape signature.

The shape signature and other data structures in the present invention are frame oriented, that is, each item of information has a specific location within a frame where each different frame carries predefined information. For example, a slant line surface is defined in a frame that includes a starting point, an ending point, a slope, a relative definition which defines which surfaces are adjacent to this line and the intercept value for the Y axis and a symbol that represents the type of surface such as SL=slant line. Vertical line, horizontal line and circle line definition frames provide similar information which allows the surfaces of the part to be defined. The information which is necessary to define a surface in the APT (Automatic Programmed Tools) machine tool language can be found in the geometric statement section of an APT programming manual.

The shape signature is provided to a computer 12 which includes a process planner module 14 and a code generator module 16. A preferred computer is an IBM AT with at least six megabytes of main memory and a hard disc drive with at least 20 megabytes of storage capacity. The process planner 14 and code generator 16 are preferably implemented using an expert system shell such as the KEE shell available from Intellicorp of Mountain View, Calif.

The process planner 14 examines the shape signature and determines a sequence of operations which will produce the shape defined by the signature. The planner 14, once the sequence of operations is determined, then selects particular rough machining processes based on the actual shapes to be machined during each operation. The planner 14 also produces a contour machining process as the last operation and, when lathe turning is the type of machining, a facing process as a first operation. The particular machine used by the sequence of operations is selected based on the processes selected, the tools used in the processes, the material type and rough stock size. The code generator 16 compares the processes to available macro-programs and selects an appropriate macro-program for each process and fills in macro-call frames with the values of the process variables determined by the planner 14. The code generator 16 then outputs the completed macro-calls to a code processor 18. A conventional code processor 18, such as a Sperry-Univac 1100, executes a conventional machine code process that produces machine code for a target machine tool 20 from the macro-calls. An appropriate process is the Computer Integrated Manufacturing-/Automatically Programmed Tools—CIM/APT Level 1R1 UP-4078 Revision .3 available from Sperry-Univac.

Figure 2:
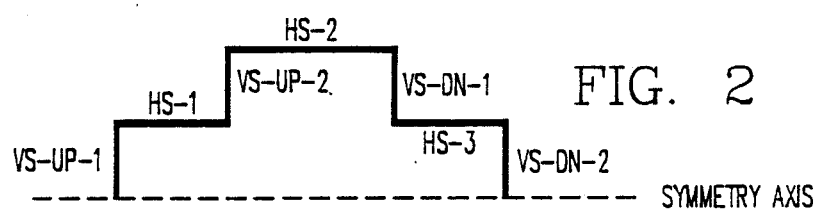
FIG. 2 is a drawing illustrating surface identification.

The shape signature is preferably an ordered list of surfaces that follow the contour of the part from right to left. If the shape signature is not ordered in this manner it must be sorted into an ordered list. Each surface in the shape signature is preferably defined using a grammar in which HS is the symbol that represents a horizontal surface, VS represents a vertical surface, SL designates a slant line, DN indicates a downward direction, UP indicates an upward direction, RD indicates a rounded surface, Q1–Q4 indicate the quadrant in which the curve of the round shape is found and a number indicates the sequence of each type of surface when scanning left to right. Each surface is referenced from the intersection of left and bottom rough stock boundaries. FIG. 2 illustrates four vertical and three horizontal surfaces defined using the preferred grammar.

Figure 3:
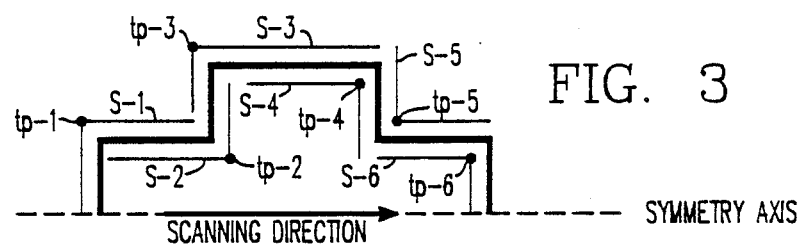
FIG. 3 is a drawing showing primitive shapes including transition points.

Using FIG. 2 as an example, the CAD/CAM system would provide the process planner 14 with a sequence of frames with each frame defining a surface and including a surface symbol which can be extracted to form the following signature list: VS-UP-1, HS-1, VS-UP-2, HS-2, VS-DN-1, HS-3, VS-DN-2. The process planner 14 scans the shape signature list from left to right and designates primitive shapes S-1. . . S-6 (See FIG. 3) where a primitive shape has two surfaces adjacent each to other and adjacent primitive shapes share a surface. The transition points tp-1. . . tp-6 for the primitive shapes are also identified where a transition point is the intersection point of two adjacent surfaces in a primitive shape. That is, each primitive shape has first and second surfaces and the first surface of each primitive shape is the second surface of the previous primitive shape, except for the first and last primitive shapes. The following steps can be used recursively to define primitive shapes:

$$S\text{-}n = \{S1(n), S2(n)\}$$
$$S1(n) = \{S2(n-1)\}$$
$$S2(n) = \{S1(n+1)\}$$
$$tp\text{-}n = \{S1(n) \cap S2(n)\}$$

where S(n) is primitive shape n, S1 and S2 are the first and second surfaces in the primitive shape and tp-n is the transition point for the primitive shape. When using this algorithm S2(0) is set equal to the first surface on the list. The primitive shapes are thereby associated with symbolic representations of the surfaces as illustrated in FIG. 3 and each primitive shape is provided with a pair of surfaces producing a primitive shape list such as List 1 below:

| LIST 1 | |
|---|---|
| VS-UP-1,HS,1 | → S-1, tp-1 |
| HS-1,VS-UP-2 | → S-2, tp-2 |
| VS-UP-2,HS-2 | → S-3, tp-3 |
| HS-2,VS-DN-1 | → S-4, tp-4 |
| VS-DN-1,HS-3 | → S-5, tp-5 |
| HS-3,VS-DN-2 | → S-6, tp-6 |

As previously mentioned, each surface has coordinates associated with the starting and ending points and the primitive shape and the transition points are the intersections between surfaces. The primitive shape list is then scanned to determine the beginning transition point for a process tree. The transition point with the largest Y coordinate encountered in the scanning direction is the beginning point for outer diameter turning work and the lowest transition point is the beginning point for inner diameter turning work. For FIGS. 2 and 3 the highest transition point would be tp-3.

Figure 4:
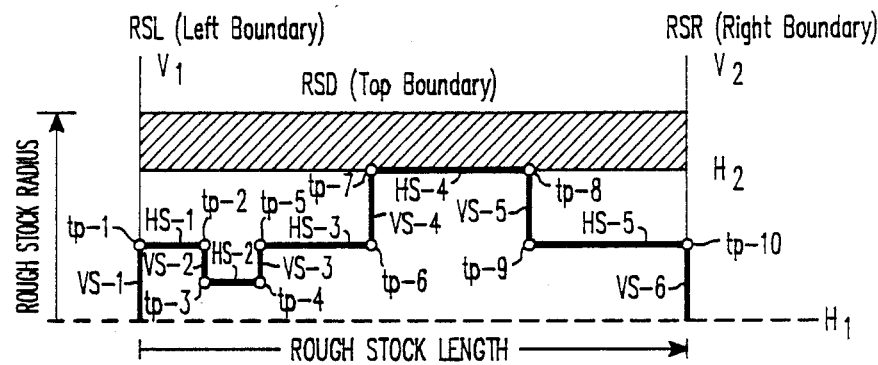
FIG. 4 is a part for which the process tree of FIG. 5 is generated.

From the list of transition points and the highest transition point, a process tree is produced and populated with boundaries. For the shape illustrated in FIG. 4, a primitive shape list including transition points and surface pairs would be produced as follows in List 2 below:

| List 2 | |
|---|---|
| VS-UP-1,HS-1 | → S-1,tp-1 |
| HS-1,VS-DN-2 | → S-2,tp-2 |
| VS-DN-2,HS-2 | → S-3,tp-3 |
| HS-2,VS-UP-3 | → S-4,tp-4 |
| VS-UP-3,HS-3 | → S-5,tp-5 |
| HS-3,VS-UP-4 | → S-6,tp-6 |
| VS-UP-4,HS-4 | → S-7,tp-7 |
| HS-4,VS-5 | → S-8,tp-8 |
| VS-DN-5,HS-DN-5 | → S-9,tp-9 |

-continued

List 2

| HS-5,VS-DN-6 | → S-10,tp-10 |

The transition points along with their coordinates are extracted and represented in a transition point list such as List 3 below:

List 3

(tp-1,tp-2,tp-3,tp-4,tp-5,tp-6,tp-7,tp-8,tp-9,tp-10)

As previously mentioned the highest transition point in the list is identified by scanning the transition points from left to right and determining the transition point with the largest Y coordinate which also has the smallest X coordinate. The transition point list is then divided into sublists at this identified highest transition point as follows in List 4:

List 4

(tp-1,tp-2,tp-3,tp-4,tp-5,tp-6,tp-7)|(tp-8,tp-9,tp-10)

As a result, the transition point tp-7 has become the root of the process tree. Next each branch of the process tree is recursively examined to determine the highest transition point in each sublist, producing lists as set forth below, where the vertical bar "|" indicates a list division:

List 5

Highest
Transition
Point tp-7  (tp-1,tp-2,tp-3,tp-4,tp-5,tp-6,tp-7) | (tp-8,tp-9,tp-10)
tp-1  (tp-1,tp-2,tp-3,tp-4,tp-5,tp-6) | (tp-8,tp-9,tp-10)
tp-2  (tp-2,tp-3,tp-4,tp-5,tp-6) | (tp-8,tp-9,tp-10)
tp-5  (tp-3,tp-4,tp-5,tp-6) | (tp-8,tp-9,tp-10)
tp-3  (tp-3,tp-4) | (tp-6) | (tp-8,tp-9,tp-10)
tp-6  (tp-4) | (tp-6) | (tp-8,tp-9,tp-10)
tp-4  (tp-4) | (tp-8,tp-9,tp-10)
tp-8  ( ) | (tp-8,tp-9,tp-10)
tp-9  | (tp-9,tp-10)
tp-10| ( )

Figure 5:
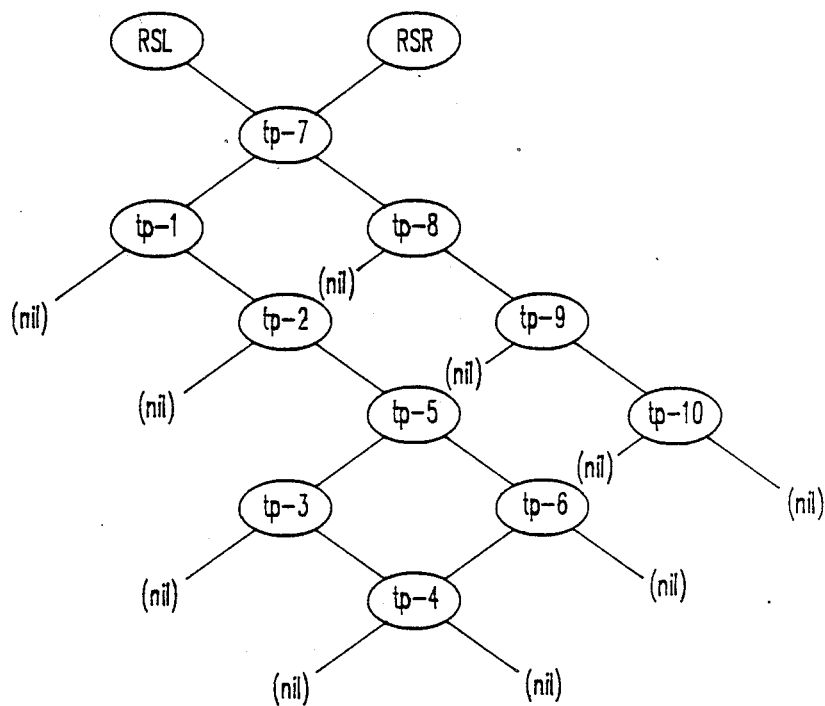
FIG. 5 is a process tree for the part of FIG. 4.

This list is represented by the process tree diagram of FIG. 5 where the vertical rough stock left (RSL) boundary and the vertical rough stock right (RSR) boundaries are the left and right parents of the root. As previously mentioned, the rough stock boundaries are provided as the dimensions of the rough stock provided in the shape signature.

Each node of the process tree, except rough stock left boundary (RSL) and rough stock right boundary (RSR), defines a machining operation region and once the process tree is defined for each node in the process tree, it is necessary to determine the top boundary, bottom boundary, left boundary and right boundary for the region designated by each node. For example, the top boundary for node tp-7 is the rough stock diameter measured as a radius from the horizontal axis H1, bottom boundary is the horizontal line HS-4, the left boundary is the rough stock left boundary (RSL) and the right boundary is the rough stock right (RSR) boundary. For transition point tp-9, the top boundary is the bottom boundary of transition point tp-8, the bottom boundary is the horizontal line HS-5, the left boundary is the vertical surface VS-5 and the right boundary is the rough stock right (RSR) boundary.

The top boundary is the bottom boundary of the parent node or the rough stock diameter if the parent is the root process. The bottom boundary is found by examining the surfaces of the node and if a horizontal surface is found it is designated as the bottom boundary. If a horizontal surface is not found, then the bottom boundary is set as a horizontal surface (construction line) through the transition point.

To determine left and right boundaries, the process planner 14 examines the two surfaces in the primitive shape associated with a node. If the left or first surface is a vertical, slant line or rounded surface it is set as the left boundary, if not one of those surfaces, the left boundary is undefined. If the right or second surface is a vertical, slant line or rounded surface it is set as the right boundary, if not, the right boundary is undefined.

Figure 6:
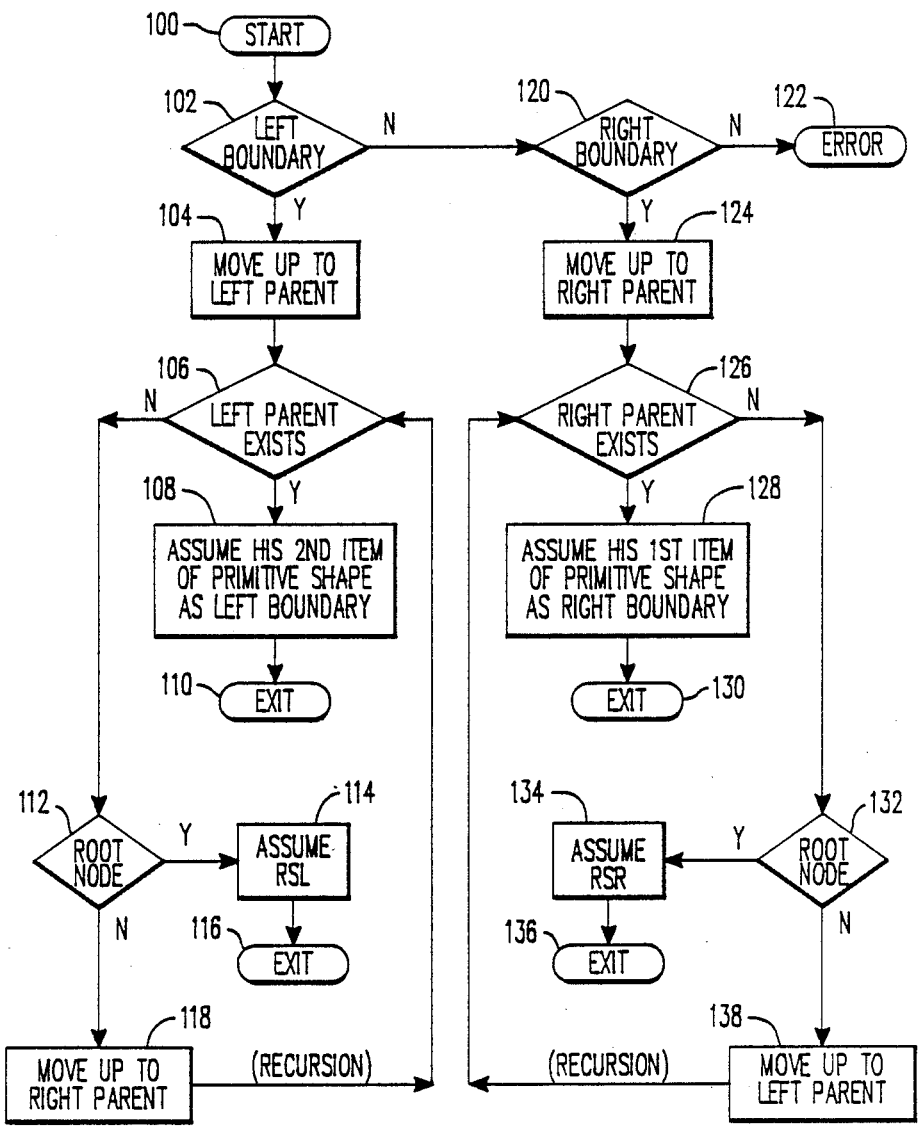
FIG. 6 illustrates a process for acquiring boundaries from a parent node in a process tree.

When a side boundary is undefined, such as for the transition point tp-6, the process of establishing boundaries must traverse the process tree in a reverse direction to obtain a boundary from a parent node. A flowchart of an algorithm which will acquire boundaries from a node higher in the tree is set forth in FIG. 6. This algorithm essentially travels backward up the tree through existing nodes until a boundary in the direction desired is encountered. If a left boundary is sought 102 the algorithm moves up 104 to the left parent and if the left parent exists 106 then the second item of the primitive shape is assumed 108 as the left boundary. If the left parent does not exist a determination is made 112 whether this is a root node. If it is a root node, the rough stock left boundary is assumed 114 as the left boundary for the node in question. If the left boundary does not exist and the parent is not a root node then the algorithm moves up 118 to the right parent to see if the right parent has a left parent from which the left boundary can be assumed. The right boundary algorithm performs in substantially the same manner traversing up the tree looking for a right parent so that the first item of the primitive shape can be assumed as the right boundary. For example, the left boundary for transition point tp-5 is inherited through tp-2 and tp-1 from tp-7 as the rough stock left boundary.

As a result of boundary determination each node has a list of four boundary surfaces associated therewith, for example, node tp-9 has left boundary =VS-DN-5, right boundary=RSR, top boundary=HS-4 and bottom boundary=HS-5. Once the process tree is completed and populated with all four boundaries then manufacturing operations for each node (region) are derived and attached to the node using a table as set forth below:

TABLE 1

| Boundary | | |
|---|---|---|
| Left | Right | Operation |
| RSL | RSR | OD Turndown |
| RSL | Surface | Right Block |
| Surface | RSR | Left Block |
| Surface | Surface | Notch |

This table identifies four different operations sufficient to create most machined turned parts, however, other specialized operations can also be recognized such as a groove, a corner, a ball, a knob, a bell, and threads. For tp-9 the process would identify a left block operation.

Once the particular operation is determined based on the left and right boundaries, the top and bottom boundaries for the node are examined and if the top boundary is the same as the bottom boundary then a NO operation is substituted. If the top and bottom boundaries are different then the process calculates the region size (width and depth) of the material to be removed. Depth is determined by subtracting the Y-coordinates of the top and bottom boundaries and width is determined by subtracting the X-coordinates of the left and right boundaries.

Once the operations have been determined, the particular process within that operation must also be determined and attached to the node. This determination can be made by comparing the shape pattern for each operation with the shape patterns in Table 2 below:

TABLE 2

| NAME | SYMBOL | PATTERN |
|---|---|---|
| NOTCH | N | VS-DN.HS.VS-UP |
| LEFT-SLANT-NOTCH | L | SL-DN.HS.VS-UP |
| RIGHT-SLANT-NOTCH | LSN | VS-DN.HS.SL-UP |
| LEFT-ROUNDED-SLANT-NOTCH | LRSN | SL-DN.RD-Q1.HS.VS-UP |
| RIGHT-ROUNDED-SLANT-NOTCH | RRSN | VS-DN-HS.RD-Q2.SL-UP |
| SLANT-NOTCH | SN | SL-DN-HS.SL-UP |
| GROOVE | G | VS-DN.RD-Q1.HS.RD-QX.VS-UP |
| RIGHT-SLANT-GROOVE | RSG | VS-DN.RD-Q1.HS.SL-UP |
| LEFT-SLANT-GROOVE | LSG | SL-DN.HS.RD-Q2.VS-UP |
| RIGHT-ROUNDED-SLANT-GROOVE | RRSG | VS-DN.RD-Q1.HS.RD-Q2.VS-UP |
| LEFT-ROUNDED-SLANT-GROOVE | LRSG | SL-DN.RD-Q1.HS.RD-Q2.VS-UP |
| SHORT-GROOVE | SHG | RD-Q1.HS.RD-Q2 |
| SHORT-RIGHT-SLANT-GROOVE | SLSG | RD-Q1.HS.SL-UP |
| SHORT-LEFT-SLANT-GROOVE | SRSG | SL-DN.HS.RD-Q2 |
| SHORT-RIGHT-ROUNDED-SLANT-GROOVE | SRRSG | RD-Q1.HS.RD-Q2.SL-UP |
| SHORT-LEFT-ROUNDED-SLANT-GROOVE | SLRSG | SL-DN.RD-Q1.HS.RD-Q2 |
| SLANT-GROOVE | SLG | SL-DN.RD-Q1.HS.RD-Q2.SL-UP |
| BLOCK | B | |
| LEFT-BLOCK | LB | VS-DN.HS |
| RIGHT-BLOCK | RB | HS.VS-UP |
| LEFT-SLANT-BLOCK | LSB | SL-DN.HS |
| RIGHT-SLANT-BLOCK | RSB | HS.SL-UP |
| LEFT-ROUNDED-SLANT-BLOCK | LRSB | SL-DN.RD-Q1.HS |
| RIGHT-ROUNDED-SLANT-BLOCK | RRSB | HS.RD-Q2,SL-UP |
| LEFT-ROUNDED-BLOCK | LRB | VS-DN.RD-Q1.HS |
| RIGHT-ROUNDED-BLOCK | RRB | HS.RD-Q2,VS-UP |
| LOW-LEFT-ROUNDED-BLOCK | LLRB | RD-Q1,HS |
| LOW-RIGHT-ROUNDED-BLOCK | LRRB | SL-DN.RD-Q1 |
| LOW-LEFT-ROUNDED-SLANT-BLOCK | LLRSB | RD-Q1.HS |
| LOW-RIGHT-ROUNDED-SLANT-BLOCK | LRRSB | HS.RD-Q2 |
| HIGH-LEFT-ROUNDED-BLOCK | HLRB | RD-Q1.VS-UP |
| HIGH-RIGHT-ROUNDED-BLOCK | HRRB | RD-Q2.VS-UP |
| LEFT-DOUBLE-SLANT-BLOCK | LDSB | SL-DN1.SL-DN2 (Alpha<180) |
| RIGHT-DOUBLE-SLANT-BLOCK | LDSB | SL-UPQ.SL-UP2 (Alpha>80) |
| LEFT-ROUNDED-DOUBLE-SLANT-BLOCK | LRRSB | SL-DN1.RD-Q1.SL-DN2 |
| RIGHT-ROUNDED-DOUBLE-SLANT-BLOCK | RRDSB | SL-UP1.RD-Q2.SL.UP2 |
| V-DOUBLE-SLANT-BLOCK | VDSB | SL-DN.SL-UP |
| REVERSE-RIGHT-SLANT-BLOCK | RRSB | SL-UP.VS-UP |
| REVERSE-LEFT-SLANT-BLOCK | RLSB | VS-DN.SL-DN |
| REVERSE-RIGHT-ROUNDED-SLANT-BLOCK | RRDSB | SL-UP.RD-Q2.VS-UP |
| REVERSE-LEFT-ROUNDED-SLANT-BLOCK | RLRSB | VS-DN.RD-Q1.SL-DN |
| CORNER | | |
| RIGHT-CORNER | RC | HS.VS-DN |
| LEFT-CORNER | LC | VS-UP.HS |
| RIGHT-ROUNDED-CORNER | RRC | HS.RD-Q3.VS-DN |
| LEFT-ROUNDED CORNER | LRC | VS-UP.RD-Q4.HS |
| RIGHT-SLANT-CORNER | RSC | SL-DN.VS-DN |
| LEFT-SLANT-CORNER | LSC | VS-UP.SL-UP |
| RIGHT-ROUNDED-SLANT-CORNER | RRSC | SL-DN.RD-Q3.VS-DN |
| LEFT-ROUNDED-SLANT-CORNER | LRSC | VS-UP.RD-Q4.SL-UP |
| LOW-LEFT-ROUNDED-CORNER | LLRC | RD-Q4.HS |
| LOW-RIGHT-ROUNDED-CORNER | LRRC | HS.RD-Q3 |
| LOW-RIGHT-ROUNDED-SLANT-CORNER | LRRSC | SL-DN.RD-Q3 |
| LOW-LEFT-ROUNDED-SLANT-CORNER | LLRC | RD-Q4.HS |
| SLANT-RIGHT-CORNER | SRC | HS.SL-DN |
| SLANT-LEFT-CORNER | SLC | SL-UP.HS |
| SLANT-ROUNDED-RIGHT-CORNER | SRRC | HS.RD-Q3.SL-DN |
| SLANT-ROUNDED-LEFT-CORNER | SRLC | SL-UP.RD-QR.HS |
| LEFT-PLATEAU-CORNER | LPC | RD-Q2.HS |
| RIGHT-PLATEAU-CORNER | RPC | HS.RD-Q1 |
| RIGHT-DOUBLE-SLANT-CORNER | RDSC | SL-DN1.SL-DN2 (Alpha>180) |
| LEFT-DOUBLE-SLANT-CORNER | LDSC | SL-UP1.SL-UP2 (Alpha>180) |

TABLE 2-continued

| NAME | SYMBOL | PATTERN |
| --- | --- | --- |
| RIGHT-ROUNDED-DOUBLE-SLANT- | RRDSC | SL-DN1.RD-Q3.SL-DN2 |
| LEFT-ROUNDED-DOUBLE-SLANT-CORNER | LRDSC | SL-UP1,RD-Q4,SL-UP2 |

Figure 7A:
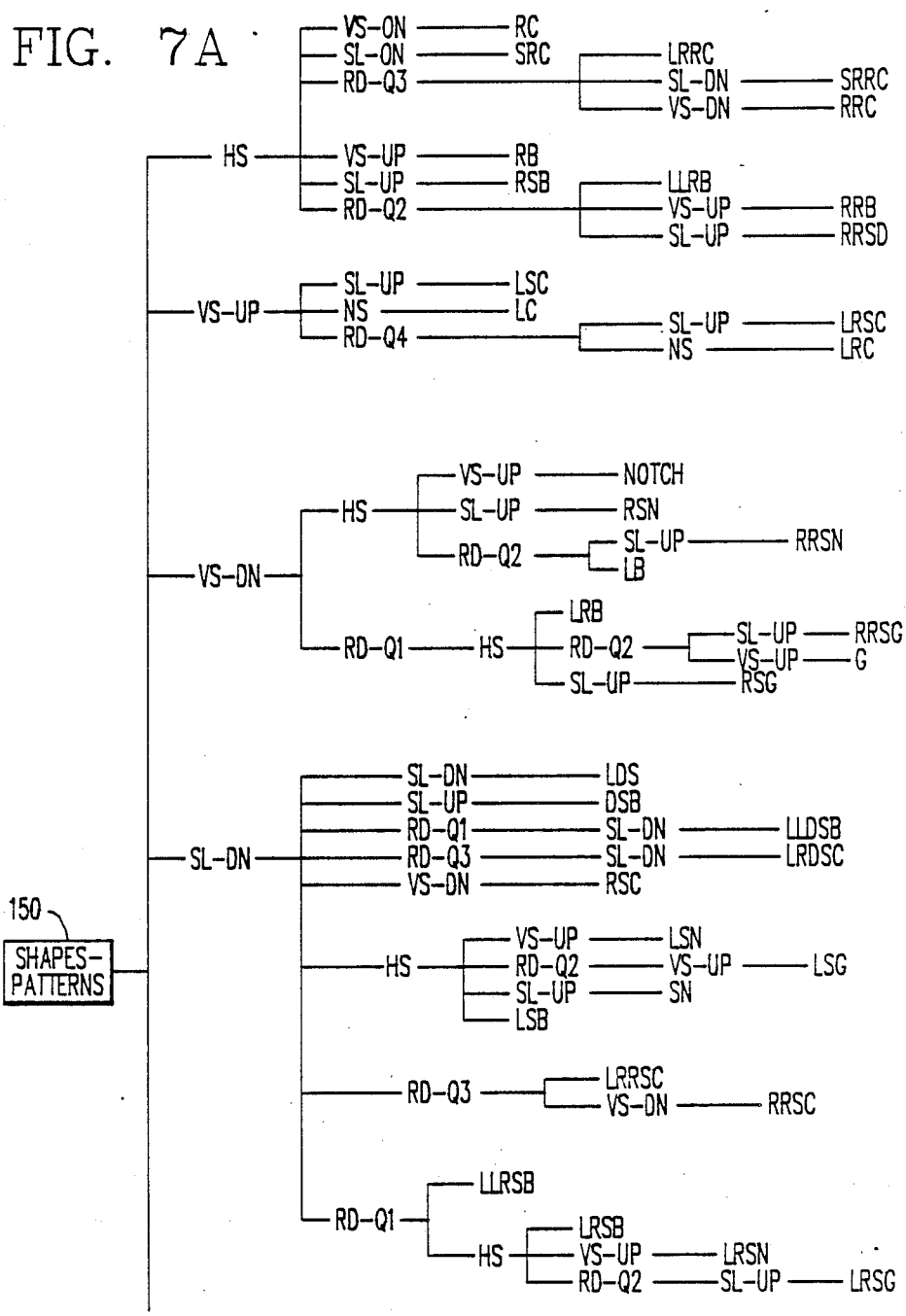
FIGS. 7A and B are a shape tree used to determine the process of a particular machining operation.
Figure 7B:
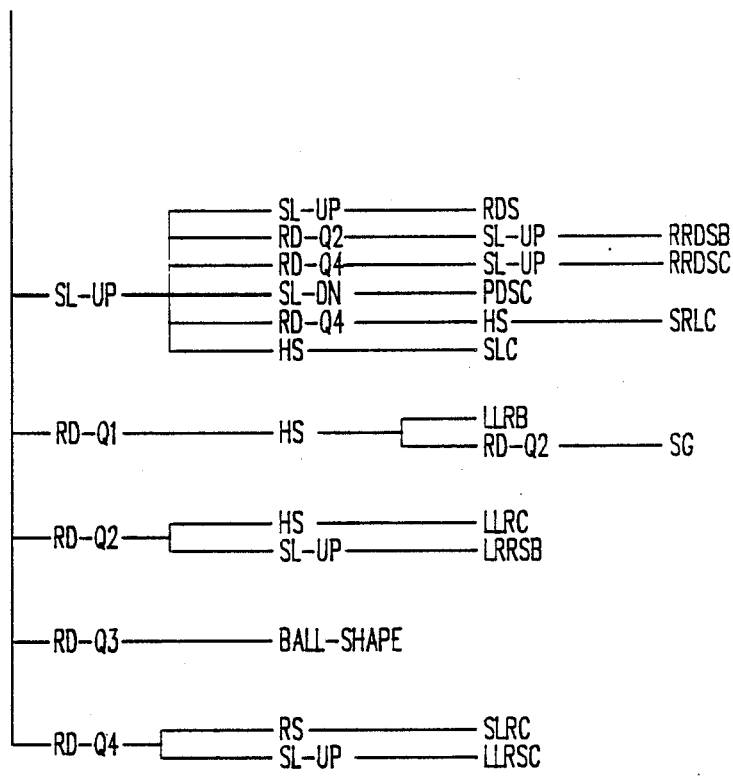
Figure 8E:
Figure 8E:
Figure 8E:
Figure 8E:
Figure 8E:
Figure 8E:
Figure 8F:
Figure 8F:
Figure 8F:
Figure 8F:
Figure 8F:
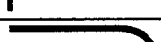
Figure 8F:

The scanning of this TABLE 2 list can occur sequentially or preferably a shapes pattern tree can be constructed as illustrated in FIG. 7 which can be used to recognize the particular process of the operation. The shapes represented by FIG. 7 or TABLE 2 are illustrated in FIGS. 8A–8H. A conventional tree searching algorithm can be used to scan the tree looking for a match to each shape specified by a node. However, the tree of FIG. 7 is designed for a preferred algorithm as described below.

The preferred tree-search method takes four arguments: (1) Current-Node which determines where we are in the shapes tree; (2) Remaining-Surfaces designating all the surfaces that remain to be processed; (3) Surface-Sublist listing surfaces comprising the current shape; and (4) Rflag determining the contour direction. When set the algorithm searches in a reverse direction on the shapes pattern tree. The tree search algorithm starts with the Current-Node set to the top level or root of the tree, namely, shapes-pattern is the object (see FIG. 7). The Remaining-Surfaces will initially be all the surfaces that make up the contour of the part. The Surface-Sublist will be empty or nil and the reverse flag (Rflag) is set accordingly. The tree search routine gets a new surface from the front of the list of Remaining-Surfaces. The list initially contains the boundary surfaces for a particular node with the order being left, bottom and right. If the first surface is the left boundary (RSL) it is discarded. The contour direction (HS, VS, etc.) of the selected surface is obtained. From the Current-Node in the shapes tree (FIG. 7), the tree search algorithm makes a list of all of the immediate subclass children of the Current-Node. For each subclass child in the list, the algorithm compares the contour direction of the surface with the contour direction value of the child. If the contour directions are found to be the same, then we have found a match and we append the current surface to the end of the Surface-Sublist. The child of the current-node that matches now becomes the Current-Node. We then must continue searching one level deeper in the tree. To do this, we shorten the list of Remaining-Surfaces by removing the first element (current surface) from the list, and recursively start the process over again at the step where a surface is gotten from the front of the remaining surfaces list. If no match is found between the current contour direction and all of the subclass children of the Current-Node, one of two things could have happened. Either there is no subclass children or the subclass children that do exist do not match. The tree search attempts to find a member child of the Current-Node. This will be in all eventualities an actual shape object. If a member child is found, then this member child is the actual shape of the feature. The tree search returns this shape and unwinds the recursion. Else, there is no corresponding shape, either the shape knowledge base is incomplete or an invalid pattern has been entered (i.e., VS-UP, VS-DN). The algorithm returns failed and unwinds the recursion stack. For tp-9 the search process would identify the process as "left block" because the surface pattern is VS-DN.HS and for tp-3 it would identify a "notch" process because the pattern is VS-DN.HS.VS-UP.

The identification of the particular process along with the type of material will identify the tool being used for the process because the process requires a particular type tool. Tool identification along with the material from the shape signature determines the depth of each rough machining pass based on tool manufacturer specifications. The depth of each pass along with the depth of material to be removed, specified in the tool description, is used to establish the number of roughing passes necessary to cut down approximately to the designated surface. The number of passes can be determined by dividing the depth of each cut by the material depth and subtracting one to allow for a finishing pass. If the division does not result in an integer a partial depth pass is determined from the remainder. It is also possible to not subtract one and make the last pass a partial depth cut to allow for a finishing pass. If the bottom boundary is a slant or rounded surface the end points of each pass must be adjusted to allow for a finishing pass. Once the particular processes are identified, the processes are attached to the operations in the corresponding node.

After the particular processes are identified the process tree is scanned and for each notch process a determination is made to see if the notch is a candidate for a plunging process. If the width of the notch is less than one inch and the left and right sides of the notch are both vertical then the notch process is changed to a plunge notch process. If the notch cannot be completed by a plunging process the process planner 14 checks to see if the notch can be cut with existing tools by comparing tool tip size to the notch width. If the width of the notch is less than one inch and the left and/or right side of the notch are not vertical the process is changed to an impossible notch due to the unavailability of cutting tools. If the notch is not a candidate for a plunging process and has not been declared impossible because of the unavailability of tools, then this notch can be cut using the notch process previously designated by the shape tree search.

Traditionally, machining operators are performed in a certain order with turndown or excess material removal coming first followed by blocks, notches and contouring. In lathe machining, however, a facing process, to establish a reference surface, is performed first and a threading operation comes after contouring. In the present invention, the process tree is scanned from top to bottom looking for turn down operations which are placed on the process list after the facing operation. The tree is then scanned from top to bottom adding left blocks to the list and then top to bottom adding right blocks. Blocks are cut in a preferred direction and the scanning for left and right blocks separately allows the machine to continue in a preferred direction and not turn the cutting head around. This improves machining efficiency. Next a scan for notches is performed to add them to the end of the list. Last the contouring and threading processes are added.

To minimize the number of tool changes the tools for adjacent levels of the tree with the same type of operation are compared and the process order is arranged to allow the minimum number of tool changes. For example, if level two uses tools 2 and 3 in processes tp-1 and tp-8 and level three uses tools 1 and 3 for processes tp-2 and tp-9 the processes would be ordered tpl-1, tp-8, tp-9 and tp-2.

As an alternative, to obtain the sequence of processes, the tree is traversed from top to bottom breadthwise to create a sequential list of rough machining processes.

A facing process in a turning operation is used to establish a reference surface from which all other surfaces are cut. The facing process is added to the front of the list of processes. A standard facing process is used in which the horizontal tool check surface at the start of the cut is the top boundary of the part being cut. The vertical clearance line in this process is the right boundary of the part being cut. The feed rate selected is determined by material being machined since the tool for facing is fixed for each machine. The center line tool check surface is the bottom boundary of the part and the desired length is the finished length.

Figure 9:
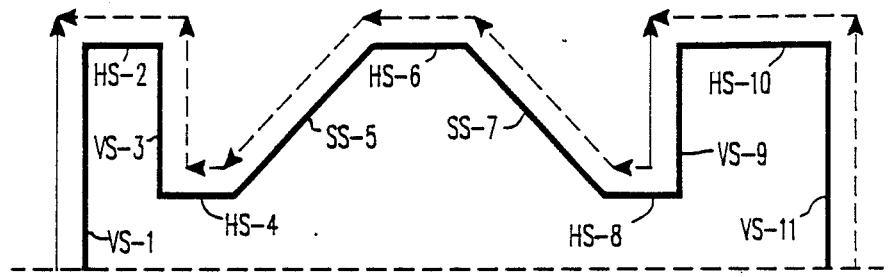
FIG. 9 shows contour passes.

A contouring pass requires that the part surfaces be treated as a continuous surface. For the part of FIG. 4, prior to creating the contouring pass, a contour surface list as follows is created: VS-UP-1, HS-1, VS-DN-2, HS-2, VS-UP-3, HS-3, VS-UP-4, HS-4, VS-DN-5, HS-5, VS-DN-6. Because contour tools are designed to travel only in a single direction, some surfaces must be cut in a different direction. The contouring passes are created using the following rules:

If surface is:
(1) Horizontal (HS).THEN continue in same direction
(2) Vertical (VS)
  (2.1) VS-UP.THEN continue in Same Direction
  (2.2) VS-DN.THEN Switch direction
(3) Slanted (SS)
  (3.1) SS-UP.THEN continue in same direction
  (3.2) SS-DN.THEN if
    (3.2.1) Slope is less than 45°
    Then Continue
    (3.2.2) Slope is greater or equal to 45° Then Switch Direction
(4) Radius (RD)
  (4.1) RD-Q1 (First Quadrant radius)
  THEN Continue
  (4.2) RD-Q2 (Second Quadrant Radius)
  THEN
    Generate a Slant Line joining the two end points of the radius and calculate its Slope.
    If Slope is greater than 45°
    Then Continue down a 45° sloped slant line
    If Slope is less than 45° Then
    Continue down the Slant line
  (4.3) RD-Q3 (Third Quadrant Radius)
  THEN Continue in same Direction
  (4.4) RD-Q4 (Fourth Quadrant Radius)
  THEN Switch Direction The above-algorithm when used on the part of FIG. 9 will produce two contouring cuts with several contouring processes in each cut as illustrated by the dashed and solid arrowed lines. The original surface starting and ending surface coordinates are used to determine the actual tool movement cuts over the surface. The result is a tool designation and a corresponding list of cuts by the tool for the right and left direction contouring passes. The part finish which is part of the original shape signature will provide the speed at which the contouring tool moves across the part to obtain the desired finish smoothness.

Figure 10:
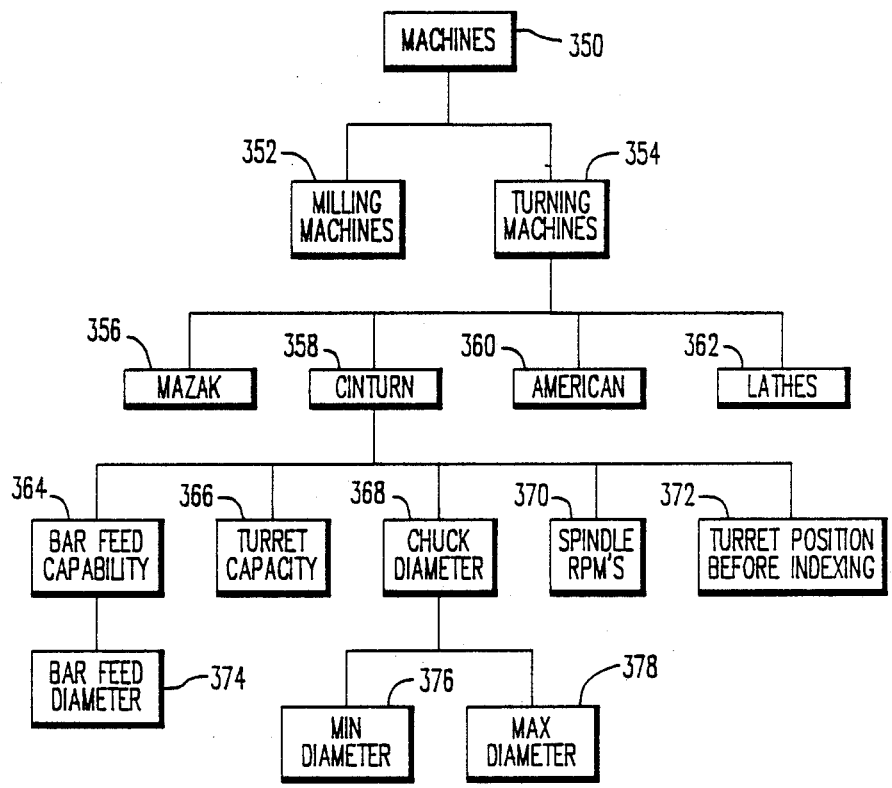
FIG. 10 is an example of a machine selection tree.

After the particular processes have been designated and the contouring or finishing pass process has been created. The tools and material are used to examine a table of feed speeds to determine the feed speeds for each process. Each tool has a preferred feed speed for a particular material as designated by and available from the tool manufacturer. The number of tools, feed speeds and rough stock geometry are used to determine a machine on which to machine the parts using a machine specification tree as illustrated in FIG. 10. The leaves of the tree are compared with the machining parameters of the processes and the particular machine is selected based on a match to the particular characteristics.

After the sequence of processes are designated or even when the processes are being designated it is possible to optimize the sequence by removing processes in which the depth of cut is less than the cut made during finishing. The depth of cut for each process is examined and if found to be less than the depth for a finishing cut then that process is set as a no operation process and will be machined during the contour pass.

Next a sequence of frames are created which designate the machine and each process. Each process frame includes a designation for the process, tool position turret, feed speed, number of passes, length of each pass and starting point. The starting point is on the top boundary (Y-coordinate) and is at the left or right boundary (X-coordinate) depending on the particular process selected. The ending point is the bottom boundary (Y-coordinate) and the left or right boundary (X-coordinate) depending on the direction of cut.

If a plunge notch process is encountered the starting and ending plunge lines must be determined along with the number of plunges. The start point is determined and if there is no vertical surface through the start point a vertical line through the start point is designated as the starting plunge line. The end plunging line is set in the same manner. The depth of the plunge is the distance between the top and bottom boundaries and the number of plunges is determined from the region width by dividing the width with the plunge tool cut width. If the division does not result in an integer value the ending plunge line is adjusted accordingly.

As each process frame is created, the tools are assigned turret numbers and a header frame is created which specifies which turret holds which tool, the machine to be used and the type and size chuck necessary to hold the rough stock specified. The chuck size can be obtained from a table that lists chucks for the machines and the range of object sizes which the chuck will hold and the chuck type is specified by the type of material. For example, a hard material will allow a chuck with hard chuck surfaces. This information should also be provided in a look-up table based on chuck manufacturers recommendations. This header also includes other standard information such as drawing number which allow the part being manufactured to be identified. A part geometry frame is also created which creates a chuck mounting reference from which all tool positions are referenced.

Each of the processes identified in FIGS. 8A–8H has an associated macro-program call which can be completed and called to generate the actual machine code for the different processes. The list of process frames is taken sequentially and used to complete the individual macrocalls to create a sequential list of processes which will complete the operations of the present invention. The standard facing process is used as previously discussed from which standard code is generated. The processes in FIGS. 8A–8H are created as macrocalls. The contouring process, the last process, determines the directions of cut as described previously. The contour signature is then examined for primitive shapes. The start point for metal removal is the intersection of adjacent primitive shapes. From the start point, the primitive shape and direction, tool clearance lines, tool positioning, tool speed and a movement command from the start point are generated. The primitive shape specifies the feeds and speeds for the material as previously discussed. Each surface of the primitive shape defines a tool movement path over which the contouring tool is moved from the start point. The primitive shapes are contoured in the direction of tool movement previously determined. The end point of the tool movement is the opposite end of the primitive shape from the start point. At the end of the primitive shape surfaces a direction vector is determined which will move the tool away from all adjacent surfaces. The direction vector defines a tool withdrawal path and the speed is set at rapid traverse to clear the tool away from the part. The generalized macro-programs for the shapes of FIGS. 8A–8H and for the contouring cuts can be created by a numerical control part programmer of ordinary skill or obtained from a library of macro-programs available at most machine shops. For example, Westinghouse has an available macro-program library which includes the shapes illustrated in FIGS. 8A–8H. The sequential numerical control code is then provided to the code processor 18 which produces the machine code for the designated machine tool based on the macro-calls.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

I claim as my invention:

1. A process for generating a numerical control program from a part drawing, comprising the steps of:
   (a) producing a shape signature from the drawing; and
   (b) generating the program from the shape signature, comprising the steps of:
      (b1) producing a process tree from the shape signature;
      (b2) determining boundaries for each node of the process tree;
      (b3) determining a machining operation from the boundaries;
      (b4) selecting processes based on the shapes defined by the boundaries; and
      (b5) producing machining program steps based on the processes selected.

2. A process as recited in claim 1, wherein step (b) comprises the steps of:
   (b1) determining primitive shapes in the shape signature;
   (b2) matching primitive shapes with processing steps; and
   (b3) combining the processing steps into the program.

3. A process as recited in claim 1, wherein step (b1) includes the steps of:
   (i) producing a list of primitive shapes and transition points from the shape signature;
   (ii) determining a highest transition point and dividing the list into sublists responsive to the determination; and
   (iii) repeating step (ii) for each sublist.

4. A process as recited in claim 1, wherein step (b2) includes the step of assuming a boundary of a parent node when a current node has a boundary undefined.

5. A process as recited in claim 1, wherein step (b3) includes comparing the boundaries to contents of a table that defines machining operations based on boundaries.

6. A process as recited in claim 1, wherein step (b4) include traversing a shape pattern tree comparing branches to boundary surfaces.

7. A process as recited in claim 1, wherein process selection includes tool designation and step (b4) includes calculating a size of a region to be machined and determining the number of rough cutting passes responsive to the size.

8. A process as recited in claim 1, wherein process selection includes tool designation and step (b4) includes process order selection by traversing the process tree concatenating processes of the same type.

9. A process as recited in claim 1, wherein step (b4) includes creating directional contouring passes from a list of part surfaces.

10. A process as recited in claim 1, wherein step (b5) includes completing a machining program macro-call designated by the selected process.

11. An apparatus for generating a numerical control program from a drawing, comprising:
    shape means for generating a shape signature from a drawing; and
    program means for generating the numerical control program from the shape signature, said program means comprising:
       means for producing a process tree from the shape signature;
       means for determining boundaries for each node of the process tree;
       means for determining a machining operation from the boundaries;
       means for selecting machining processes based on the shape defined by the boundaries; and
       means for producing machining program steps from the processes selected.

12. A process for generating a numerical control program from a part drawing, comprising the steps of:
    (a) producing a shape signature from the drawing; and
    (b) generating the program from the shape signature comprising the steps of:
       (b1) producing a process tree from the shape signature and including the steps of:
          (i) producing a list of primitive shapes and transition points from the shape signature;
          (ii) determining a highest transition point and dividing the list into sublists responsive to the determination; and
          (iii) repeating step (ii) for each sublist.
       (b2) determining boundaries for each node of the process tree and including assuming a boundary of a parent node when a current node has a boundary undefined;

(b3) determining a machining operation from the boundaries by comparing the boundaries to contents of a table that defines machining operations based on boundaries;

(b4) selecting processes based on the shapes defined by the boundaries by scanning a shape pattern tree comparing branches to boundary surfaces; and (b5) producing machining program steps based on the processes selected by completing a machining program macro-call designated by the selected process.

* * * * *